US012793227B2

(12) United States Patent
Lee et al.

(10) Patent No.: US 12,793,227 B2
(45) Date of Patent: Nov. 10, 2026

(54) CONTOUR PROBABILITY PREDICTION METHOD

(71) Applicant: Samsung Electronics Co., Ltd., Suwon-si (KR)

(72) Inventors: Hyeok Lee, Suwon-si (KR); Jaewon Yang, Suwon-si (KR); Gun Huh, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 296 days.

(21) Appl. No.: 18/594,453

(22) Filed: Mar. 4, 2024

(65) Prior Publication Data

US 2024/0303824 A1 Sep. 12, 2024

(30) Foreign Application Priority Data

Mar. 8, 2023 (KR) ........................ 10-2023-0030810

(51) Int. Cl.
*G06T 7/12* (2017.01)
*G06T 7/00* (2017.01)
*G06T 7/143* (2017.01)

(52) U.S. Cl.
CPC .............. *G06T 7/12* (2017.01); *G06T 7/0004* (2013.01); *G06T 7/143* (2017.01);
(Continued)

(58) Field of Classification Search
CPC ......... G06T 7/12; G06T 7/0004; G06T 7/143; G06T 2207/20081; G06T 2207/20084;
(Continued)

(56) References Cited

U.S. PATENT DOCUMENTS

| | | | |
|---|---|---|---|
| 10,621,302 | B2 | 4/2020 | Sha et al. |
| 10,795,267 | B2 | 10/2020 | Hansen |

(Continued)

FOREIGN PATENT DOCUMENTS

| | | | | |
|---|---|---|---|---|
| KR | 10-2022-0073828 A | 6/2022 | | |
| WO | WO-2021083608 A1 * | 5/2021 | ............. | G06V 10/82 |

OTHER PUBLICATIONS

Chen X, Men K, Chen B, Tang Y, Zhang T, Wang S, Li Y, Dai J. CNN-Based Quality Assurance for Automatic Segmentation of Breast Cancer in Radiotherapy. (Year: 2020).*

*Primary Examiner* — Matthew C Bella
*Assistant Examiner* — Shane Wrensford Codrington
(74) *Attorney, Agent, or Firm* — Harness, Dickey & Pierce, P.L.C.

(57) ABSTRACT

Provided is a contour probability prediction method of probabilistically predicting a contour, the contour probability prediction method including acquiring a plurality of contour images for an image of a wafer on which a process has been performed according to a design image, calculating a contour average and a contour standard deviation from the plurality of contour images, generating a probability distribution image calculated with a predetermined probability distribution, on the basis of the contour average and the contour standard deviation, and deep-learning-training a probability prediction model by inputting the design image and the probability distribution image into the probability prediction model.

20 Claims, 12 Drawing Sheets

(52) U.S. Cl.
CPC ............... *G06T 2207/20081* (2013.01); *G06T 2207/20084* (2013.01); *G06T 2207/30148* (2013.01)

(58) Field of Classification Search
CPC ......... G06T 2207/30148; G06T 7/0006; G06T 7/001; G06T 7/13; G06T 7/62; G06T 2207/10061; G06T 2207/20076; G06V 20/69; G06V 10/82; G06V 2201/06; G06N 3/0475; G06N 3/094; G03F 7/70625
See application file for complete search history.

(56) References Cited

U.S. PATENT DOCUMENTS

| | | | | |
|---|---|---|---|---|
| 11,061,373 | B1 | 7/2021 | Khaira et al. | |
| 11,079,687 | B2 * | 8/2021 | Slachter | G03F 7/70625 |
| 11,443,083 | B2 | 9/2022 | Su et al. | |
| 2022/0146945 | A1 | 5/2022 | Lucas et al. | |
| 2022/0299881 | A1 | 9/2022 | Zheng et al. | |
| 2022/0327364 | A1 | 10/2022 | Hunsche et al. | |
| 2022/0335333 | A1 | 10/2022 | Cao et al. | |
| 2022/0342316 | A1 * | 10/2022 | Kooiman | G06T 7/001 |
| 2022/0404712 | A1 | 12/2022 | Zhang et al. | |

* cited by examiner

CONTOUR PROBABILITY PREDICTION METHOD

CROSS-REFERENCE TO RELATED APPLICATION

This application is based on and claims priority under 35 U.S.C. § 119 to Korean Patent Application No. 10-2023-0030810, filed on Mar. 8, 2023, in the Korean Intellectual Property Office, the disclosure of which is incorporated by reference herein in its entirety.

BACKGROUND

The inventive concepts relate to a semiconductor process, and more particularly, to a method of probabilistically predicting the contour of patterns formed on a wafer.

Recently, as the sizes of memory cells have been reduced for high integration of information and communication devices, operating circuits and electrical connections for the operation of semiconductor devices are becoming complicated. Accordingly, in the manufacture of semiconductor devices, an Extreme Ultraviolet (EUV) lithography process is applied to enable fine dimensional processing. However, in an EUV lithography process, the number of photons per area is reduced to 1/14 compared to Deep Ultraviolet (DUV) patterning, thereby being vulnerable to poor patterning due to random distribution of photons.

SUMMARY

The inventive concepts provide a method of probabilistically predicting a contour formed by a patterning process.

The task to be solved by the technical idea of the inventive concepts is not limited to the above-mentioned task, and other tasks not mentioned may be clearly understood by those of ordinary skill in the art from the following description.

According to an aspect of the inventive concepts, there is provided a contour probability prediction training method of probabilistically predicting a contour, the contour probability prediction method including acquiring a plurality of contour images for an image of a wafer on which a process has been performed according to a design image, determining a contour average and a contour standard deviation from the plurality of contour images, generating a probability distribution image representing a probability distribution, based on the contour average and the contour standard deviation, and deep-learning-training a probability prediction model using the design image and the probability distribution image as inputs for the probability prediction model.

In addition, according to another aspect of the inventive concepts, there is provided a contour probability prediction method for probabilistically predicting a contour, the contour probability prediction method including acquiring a plurality of contour images for an image of a wafer on which a process has been performed according to a design image, determining a contour average and a contour standard deviation from the plurality of contour images, generating a probability distribution image representing a probability distribution based on the contour average and the contour standard deviation, deep-learning-training a probability prediction model using at least a portion of the design image and at least a portion of the probability distribution image corresponding to at least the portion of the design image as inputs for the probability prediction model, generating a wafer probability prediction image for the design image by inputting the design image of the wafer to the probability prediction model after the deep-learning-training, and outputting a corresponding target pattern as a hotspot when a probability value, corresponding to a probability of a defect pattern forming, of each of a plurality of target patterns included in the generated wafer probability prediction image is equal to or greater than a threshold value, wherein the probability value corresponding to the defect pattern is a value representing a probability that each of the plurality of target patterns deviates from a valid standard.

In addition, according to another aspect of the inventive concepts, there is provided a contour probability prediction method of probabilistically predicting a contour, the contour probability prediction method including acquiring a plurality of contour images for a portion of a wafer in at least one of an after development inspection (ADI) inspection state or an after clean inspection (ACI) state of the wafer on which an extreme ultraviolet (EUV) photolithography process has been performed according to a design image, determining a contour average and a contour standard deviation from the plurality of contour images, generating a probability distribution image representing a probability distribution based on the contour average and the contour standard deviation, deep-learning-training a probability prediction model using at least the portion of the design image and at least a portion of the probability distribution image corresponding to at least the portion of the design image as inputs for the probability prediction model, generating a wafer probability prediction image for the design image by inputting the design image of the wafer to the probability prediction model after the deep-learning-training, and outputting a corresponding target pattern as a hotspot when a probability value, corresponding to a probability of a defect pattern forming, of each of a plurality of target patterns included in the generated wafer probability prediction image is equal to or greater than a threshold value, wherein the probability value corresponding to the defect pattern is a value representing a probability that each of the plurality of target patterns deviates from a valid standard.

BRIEF DESCRIPTION OF THE DRAWINGS

Embodiments of the inventive concepts will be more clearly understood from the following detailed description taken in conjunction with the accompanying drawings in which.

DETAILED DESCRIPTION OF THE EMBODIMENTS

Figure 1:
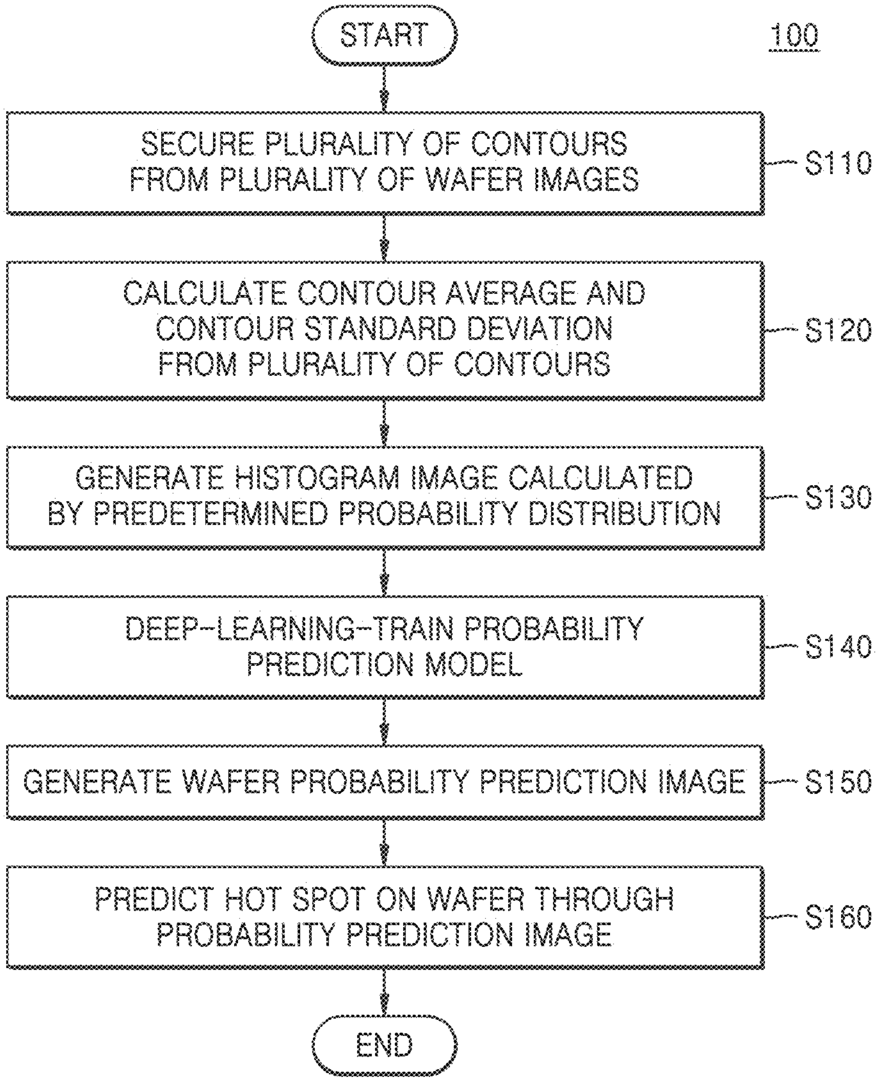
FIG. 1 is a flowchart illustrating a contour probability prediction method of probabilistically predicting a contour, according to at least one embodiment.

Hereinafter, embodiments of the technical idea of the inventive concepts will be described in detail with reference to the accompanying drawings. The same reference numerals are used for the same components in the drawings, and redundant descriptions thereof will be omitted. When the terms "about" or "substantially" are used in this specification in connection with a numerical value, it is intended that the associated numerical value includes a manufacturing tolerance (e.g., ±10%) around the stated numerical value. Further, regardless of whether numerical values are modified as "about" or "substantially," it will be understood that these values should be construed as including a manufacturing or operational tolerance (e.g., ±10%) around the stated numerical values.

Figure 2:
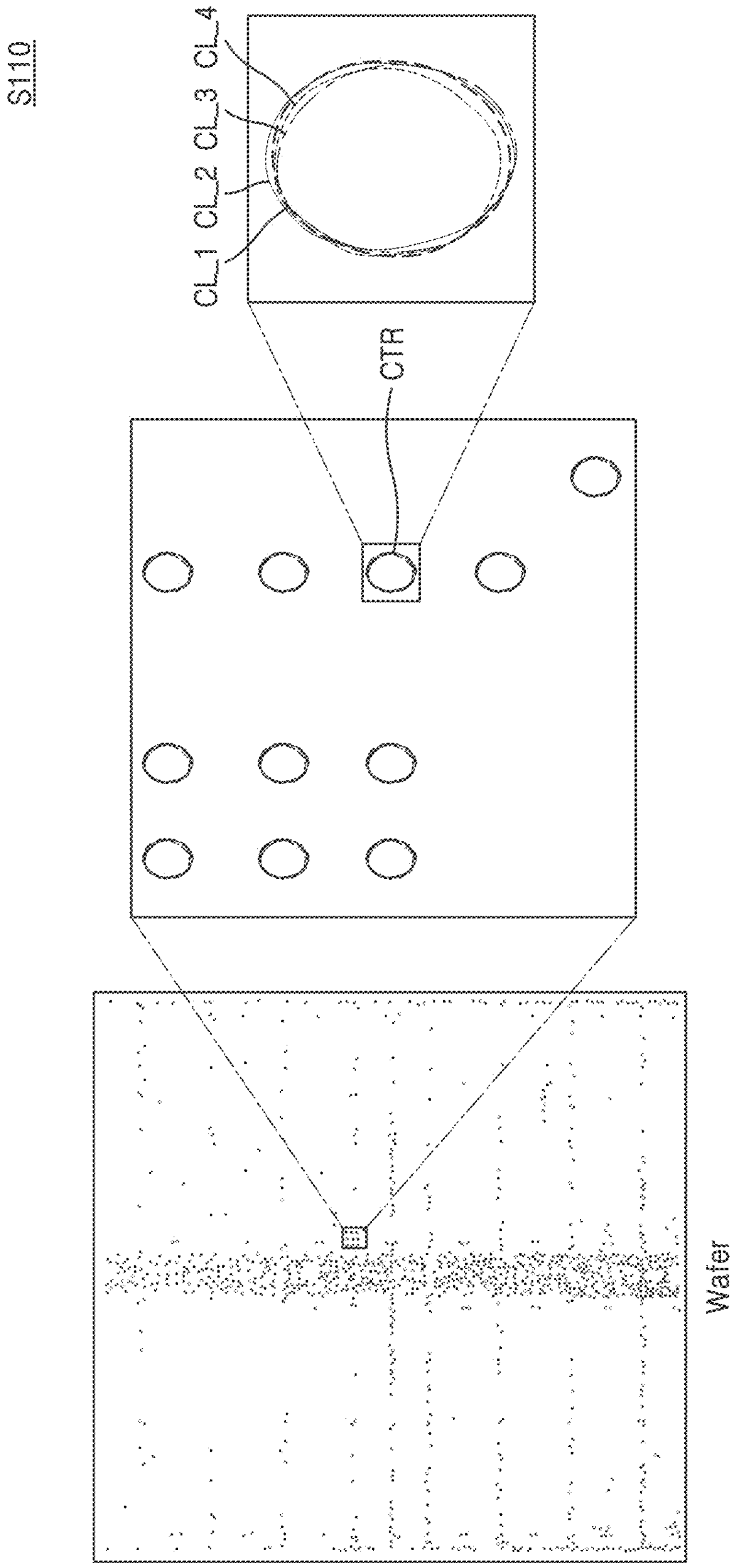
FIG. 2 is a diagram illustrating an operation in a contour probability prediction method of probabilistically predicting a contour, according to at least one embodiment.
Figure 3:
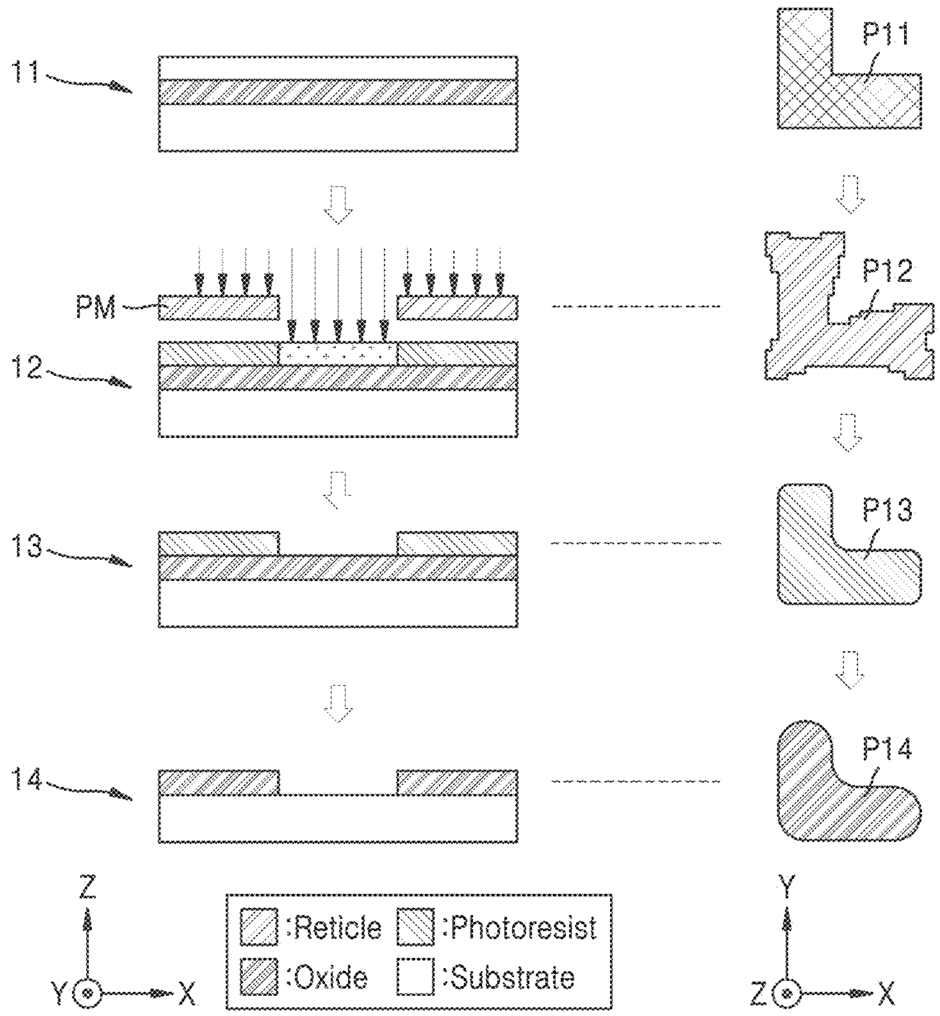
FIG. 3 shows diagrams illustrating a contour probability prediction method of probabilistically predicting a contour, according to at least one embodiment.

FIG. 1 is a flowchart illustrating a contour probability prediction method 100 for probabilistically predicting a contour according to at least one embodiment. FIG. 2 is a diagram illustrating an operation S110 in a contour probability prediction method of probabilistically predicting a contour according to at least one embodiment. FIG. 3 shows diagrams illustrating a contour probability prediction method of probabilistically predicting a contour according to at least one embodiment.

Referring to FIGS. 1 and 2, a plurality of contours may be secured from a plurality of wafer images (S110). The plurality of wafer images may be images acquired through a microscope such as a scanning electron microscope (SEM), and contours may be extracted therefrom. SEM images may be generated from NGR series equipment, SEM equipment from Nano Geometry Research (NGR) Inc., and/or the like.

Here, the SEM images may be images of a photoresist pattern generated by an after development inspection process and/or images of an actual circuit pattern generated by an after clean inspection process. FIG. 2 illustrates overlapping of different contours by merging contour images extracted from SEM images for the same region of different wafers (and/or different chips of the same wafer).

A lithography process will be described with reference to FIG. 3. FIG. 3 is a diagram illustrating a process of manufacturing an integrated circuit by a lithography process. Specifically, the left side of FIG. 3 sequentially represents cross-sectional views of the structures formed by semiconductor processes, and the right side of FIG. 3 sequentially represents plan views of the structures formed by the semiconductor processes. As shown in FIG. 3, the integrated circuit may include patterns formed on a plurality of layers stacked in the Z-axis direction.

The semiconductor process may include various sub-processes to form patterns included in the integrated circuit. For example, the semiconductor process may include photolithography. The photolithography is a process of forming a pattern by transferring a geometric pattern from a photomask to a photoresist by using light. The photoresist may include a positive photoresist in which a portion of the photoresist (e.g., where the light is irradiated) is dissolved by a developer or a negative photoresist in which a portion of the photoresist (e.g., where the light is not irradiated) is dissolved by a developer. FIG. 3 illustrates an example of photolithography for forming a first pattern P11 having an "L" shape in an oxide layer by using a positive photoresist. In this disclosure, a pattern with a shape desired by a designer, such as the first pattern P11, may be referred to as an ideal pattern.

In the example of FIG. 3, the treatment of an oxide layer formed on a wafer is described, but a person skilled in the art may easily reach the treatment of various materials such as a metal layer, a dielectric material layer, a crystalline/amorphous silicon layer, and the like formed on the wafer, on the basis of what is described here.

Referring to the left side of FIG. 3, a first structure 11 may include a wafer, an oxide layer, and a photoresist layer sequentially stacked. For example, an oxide layer may be formed on a cleaned wafer, and a positive photoresist may be applied on the oxide layer. In some embodiments, the positive photoresist may be applied on the oxide layer by spin coating. In some embodiments, after the photoresist is applied, the wafer may be heated to remove excess solvent, in a pre-exposure bake process.

The material constituting the photoresist layer may be sensitive to radiation, such as Ultra Violet (UV) rays, Deep UV (DUV) rays, Extreme UV (EUV) rays, excimer laser beams, X rays, and electrons, and/or the like. In the case of an EUV exposure process, the use of a material with a high EUV absorption rate is required because the number of photons during exposure is less than that of an exposure process such as a DUV process. Accordingly, the photoresist material for EUV may include, for example, hydroxy styrene, which is a polymer. Furthermore, iodophenol may be provided as an additive to the EUV photoresist.

According to some embodiments, the thickness of the photoresist layer may range from about 0.1 μm to about 2 μm. According to some embodiments, the thickness of the photoresist layer may range from about 200 nm to about 600 nm. For EUV photoresist, the dilute concentration of the photoresist solution may be provided in a thin thickness by spin coating.

In some cases, the photoresist may include an inorganic material such as tin oxide. In this case, even when the photoresist is removed through a strip process after a lithography process and a subsequent process are completed, the inorganic material may remain at a concentration of about $1*10^{11}/cm^3$ or less in an underlayer of the photoresist. When an inorganic material is used as a photoresist, it is easy to thin the thickness of the photoresist, and the etching selectivity is high, so a hard mask layer to be described later may be thinly implemented.

When the thickness of the etching target layer is great, a hard mask layer including amorphous carbon may be further provided under the photoresist. According to some embodiments, the hard mask layer may further include fluorine. When the hard mask layer includes fluorine, EUV sensitivity of the photoresist may be enhanced. In addition, an anti-reflection layer may be further provided between the hard mask layer and the photoresist.

A photomask PM may be aligned on the first structure 11, and a second structure 12 may be formed by irradiating radiation beams onto the aligned photomask PM. As illustrated in FIG. 3, the positive photoresist exposed to the radiation beams in the photoresist layer may be chemically deformed. In some embodiments, the photomask PM may be referred to as a reticle and may include a material (e.g., chromium (Cr)) through which the radiation beams do not transmit, which is formed on or under a glass layer through which the radiation beams may be transmitted.

The radiation beams may include, for example, UV rays, DUV rays, EUV rays, excimer laser beams, X rays, electron beams, and/or the like. According to embodiments, the wavelength of the EUV radiation may range from about 4 nm to about 124 nm. According to embodiments, the wavelength of the EUV radiation may range from about 5 nm to about 20 nm. According to some embodiments, the wavelength of the EUV radiation may range from about 13 nm to about 14 nm. According to some embodiments, the wavelength of the EUV radiation may be about 13.5 nm.

A radiation system for generating EUV radiation may include, e.g., a laser for exciting a plasma source and a source collector module for storing plasma to provide the plasma. For example, the plasma may be generated by irradiating laser beams to particles of tin and/or plasma sources such as Xe gas or Li vapor. The radiation system is generally referred to as a laser production plasma (LPP) source. Alternative sources include discharge plasma sources and/or sources based on, e.g., synchrotron radiation provided by electron storage rings and/or the like may be included.

In general, the exposure process using the EUV radiation beams may be performed by reduction projection (e.g., reduction projection of about 4:1). A mask pattern is reduced to a size of about a quarter and mapped to a semiconductor wafer, and the full shot may eventually correspond to about a quarter of the size of the entire mask pattern. Here, ¼ is the reduction ratio of the length, and the reduction ratio of the area may correspond to a reduction of about 1/16. Accordingly, since the pattern formed on the lithography mask has a larger threshold number than the pattern mapped to the actual wafer, the reliability of the lithography process may be improved.

Here, the exposure method may be classified into a scanning method of continuously photographing and a step-by-step method of photographing step by step. In general, the EUV exposure process proceeds in a scanning manner, and an EUV exposure device is generally referred to as a scanner. In addition, scanning in the EUV exposure device may be performed using a slit that limits light to a partial area of the mask. Here, the slit may be a unit that limits radiation in a device that performs an extreme ultraviolet (EUV) exposure process so that the radiation is uniformly irradiated onto an EUV photomask. The radiation is limited to be irradiated onto some regions of the mask through slits, but, in at least some embodiments, the radiation may be continuously irradiated while moving the mask in the opposite direction to a direction desired to scan. As described above, an area in which radiation is irradiated on the test wafer through scanning over the entire area of the mask may be an area corresponding to a full shot.

According to some embodiments, the photomask PM may be an extreme ultraviolet (EUV) photomask. According to some embodiments, the photomask PM may include a silicon wafer and a plurality of silicon layers and molybdenum layers alternately arranged on the silicon wafer. The photomask PM may further include a ruthenium (Ru)-containing layer arranged on a silicon-molybdenum layer alternately stacked. A layout pattern including a tantalum boron nitride (TaBN)-containing layer and a lawrencium-containing layer may be formed on the ruthenium-containing layer. The various materials and layers disclosed in this specification for photomasks PMs for EUV are for illustrative purposes only and do not limit the technical idea of this inventive concepts in any sense.

Light passing through the opening of the photomask PM may be diffracted, and as the pattern becomes finer, an Optical Proximity Effect (OPE) may appear due to the influence between neighboring patterns and/or structures. Optical probability correction (OPC) may be employed to compensate for errors caused by the diffraction and the OPE described above. In other words, the OPC generates a mask pattern by calculating the degree to which the result product is deformed when the mask pattern is reflected on the wafer and correcting the deformation value. For example, as shown on the right side of FIG. 3, in order to form the first pattern P11, the second pattern P12, to which the OPC is applied, may be formed on the photomask PM, and the second pattern P12, may have a different shape from the first pattern P11. The second pattern P12 may have a shape modified by the OPC.

A developing process of removing a portion irradiated with radiation from the photoresist layer with a developer may be performed on a second structure 12. Accordingly, as shown in FIG. 3, a third pattern P13 may be formed on the photoresist layer. In some embodiments, the developer may be provided using, e.g., a spinner, like the photoresist. For example, a spinner and a solvent may be applied to the photoresist layer after development such that undeveloped regions of the photoresist layer are removed by the solvent and the spinning.

Etching may be used to remove portions of the uppermost layer that are not protected by the photoresist. For example, etching may be performed in the third structure 13, and accordingly, a portion of the oxide layer that is not protected by the photoresist may be etched. The etching may include wet (or liquid) etching and/or dry (or plasma) etching. After the etching is completed, the photoresist may be removed by a cleaning process, and accordingly, a fourth pattern P14 may be formed in the oxide layer as shown in FIG. 3. According to some embodiments, the wafer may also be heated to remove the residual solvent by the cleaning process.

As illustrated in FIG. 3, the shape of the pattern may be changed as the sub-processes are performed, which may be modeled as transformation of the pattern. For example, the first pattern P11 corresponding to the ideal pattern may be transformed into the second pattern P12 by applying the OPC, and the second pattern P12 may be transformed into the third pattern P13 in an after development inspection (ADI) state by irradiation and development. In addition, the third pattern P13 may be deformed into a fourth pattern P14 in an ACI state by etching and washing. As a result, the fourth pattern P14 may have a shape different from that of a target (or an ideal) pattern, that is, the first pattern P11, and it may be important to determine the shape of the second pattern P12 so that the fourth pattern P14 has the shape most similar to that of the first pattern P11.

By simulating errors caused by diffraction of light passing through the photomask PM, estimating the third pattern P13 which is the pattern of the photoresist after development from the second pattern P12 which is the pattern on the photomask PM may be referred to as an optical rule check (ORC).

Figure 4:
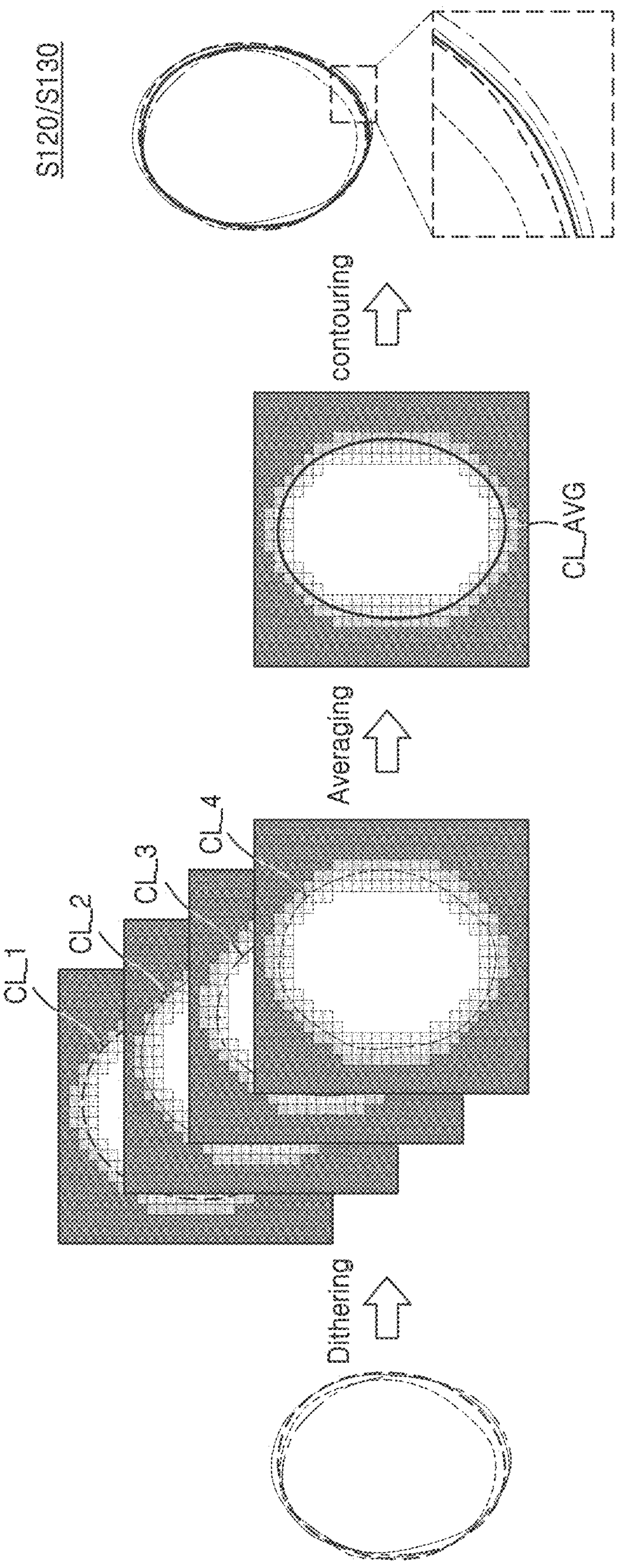
FIGS. 4 and 5 are diagrams illustrating a process of calculating a contour average through an overlapped contour image.
Figure 5:
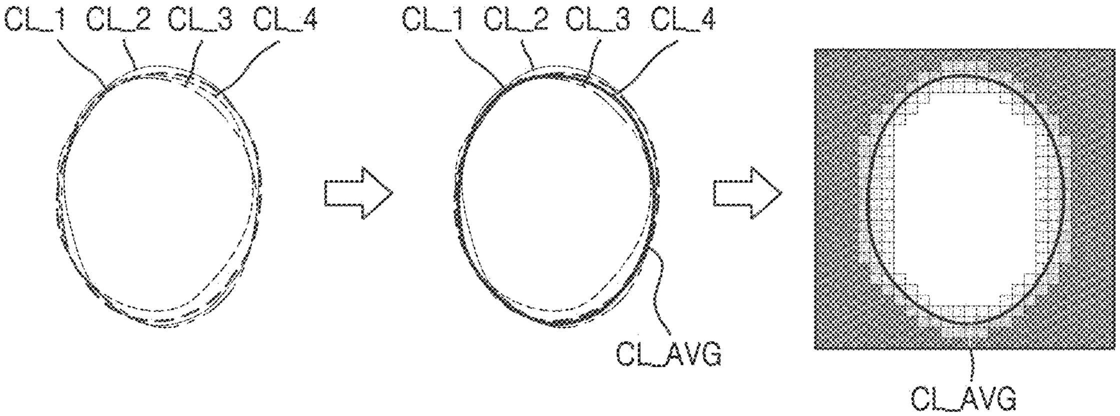

FIGS. 4 and 5 are diagrams illustrating operations S120 and S130 as a process of calculating a contour average through an overlapped contour image of FIG. 2.

Referring to FIGS. 1, 4, and 5, a contour average and a contour standard deviation may be calculated from a plurality of contours secured from a plurality of wafer images (S120), and a histogram image calculated with a predetermined probability distribution may be generated (S130).

In some embodiments, each of the contour images extracted from the plurality of SEM image images is converted into a gray scale image. For example, the contour is converted into a contour histogram image via dithering based on each contour. According to embodiments, the contour histogram image may be a gray scale image. In this disclosure, the contour histogram image may be referred to as a contour image. A contour average CL_AVG of a plurality of contours may be calculated by overlapping the plurality of contours that have undergone dithering. In at least one embodiment, a first contour CL_1, a second contour CL_2, a third contour CL_3, and a fourth contour CL_4 may each be obtained from and correspond to four SEM images. A plurality of contour images are overlapped, and a contour average CL_AVG is calculated from the plurality of contour images. A contour standard deviation CL_STD may be calculated through a plurality of contour image based on the contour average CL_AVG. According to some embodiments, the contour image may be an 8-bit gray scale image, but is not limited thereto. For example, the counter image may be configured to include 8, 16, etc. bits. A contour average and a contour standard deviation may be determined based on a deviation on the basis of the contour average CL_AVG. Contour histogram images extracted in an OPC verification operation after a training operation of a contour probabilistic prediction model 10 (see FIGS. 8A to 8C) described later may also include information on an average and a standard deviation defined in a similar manner.

A contour histogram image may be generated by applying a predetermined probability distribution model to the calculated contour average and contour standard deviation. In the disclosure, the contour histogram image to which the predetermined probability distribution model is applied may be referred to as a probability distribution image. Instead of generating a contour histogram image for a very large number of process result products, the contour probability prediction method 100 is a probabilistic prediction method through a limited contour image. In at least one embodiment, the probability distribution image may be calculated from ten (10) or less limited contour images and may be generated by a predetermined probability distribution.

From the ten or less limited contour images, a contour average and a contour standard deviation are calculated and a probability distribution image is generated by a predetermined probability distribution based on the calculated contour average and contour standard deviation. As for the predetermined probability distribution, an appropriate probability distribution model may be selected as necessary. In at least one embodiment, a probability distribution image may be generated using the contour average and the contour standard deviation through the Gaussian distribution. For example, as shown in FIGS. 2, 4, and 5 of this disclosure, a probability distribution image may be generated according to a predetermined probability distribution from four contour images.

Figure 6:
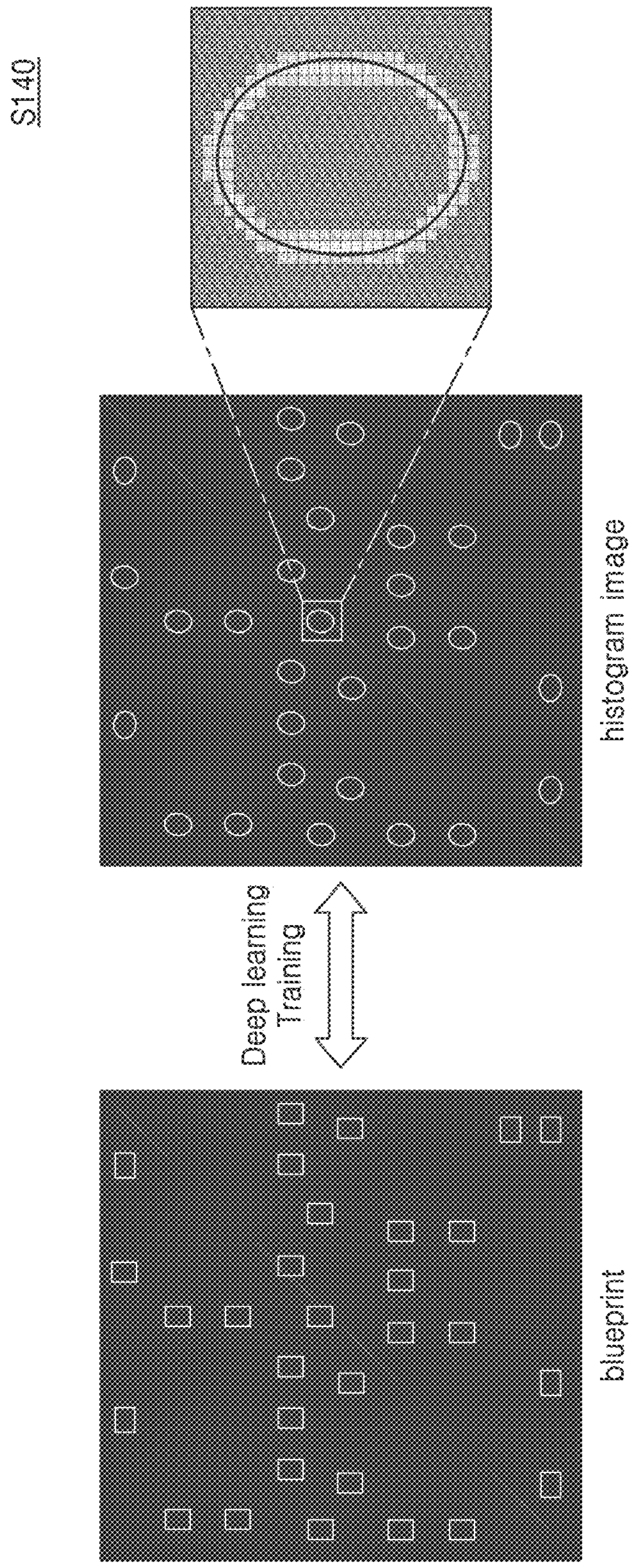
FIG. 6 is a diagram illustrating an operation in a contour probability prediction method of probabilistically predicting a contour, according to at least one embodiment.

FIG. 6 is a diagram illustrating an operation S140 in a contour probability prediction method of probabilistically predicting a contour according to at least one embodiment.

Referring to FIGS. 1 and 6, the left figure shows a design diagram of a portion of a wafer that is an object of deep learning training. In the disclosure, for example, a contour probability prediction method 100 of probabilistically predicting a contour for a rectangular pattern, which is a target pattern, is described, but this is only an example, and the inventive concepts are not limited by the shape of the pattern. Referring to FIG. 6, an operation (S140) of deep-learning-training a contour probability prediction model 10 in FIG. 1 is described.

The right picture of FIG. 6 is a probability distribution image generated from the SEM image of the wafer that has undergone a process for the same region of different wafers (different chips of the same wafer). As described in FIG. 3, a pattern (having a shape different from the target pattern (may be formed from an pattern having a target shape desired by a designer. The pattern may be a pattern in an after development inspection (ADI) state through irradiation and development, and/or a pattern in an after clean inspection (ACI) state through etching and cleaning.

Figure 7:
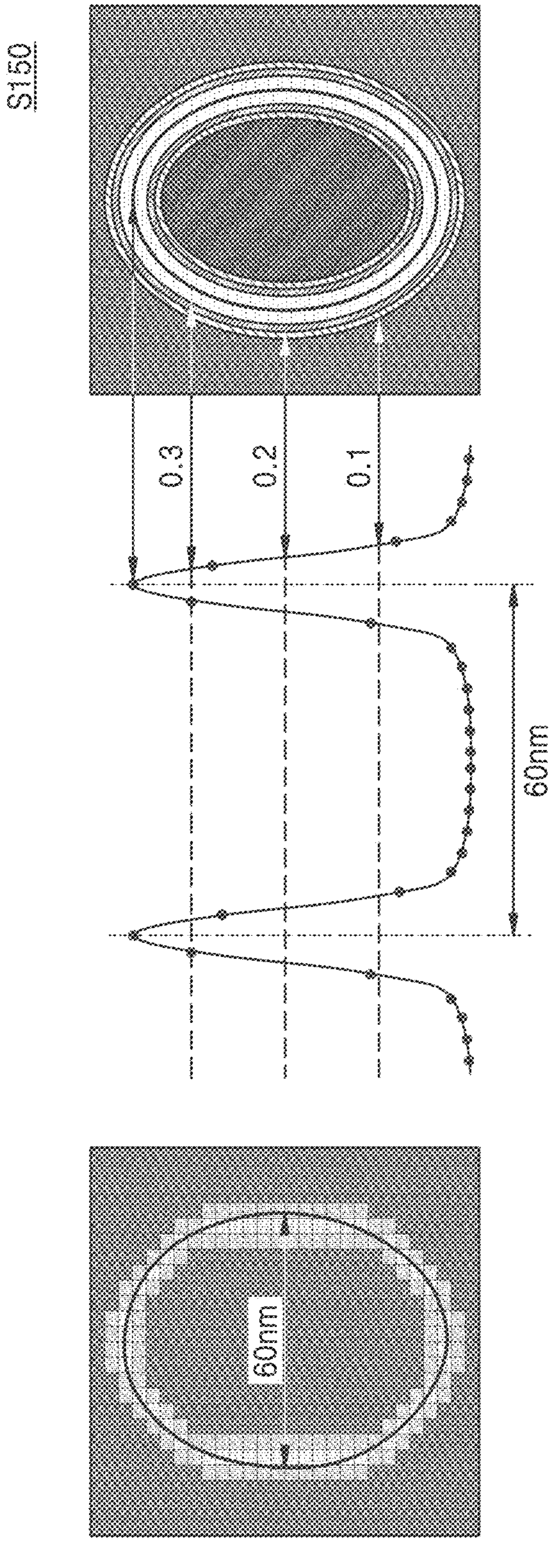
FIG. 7 is a diagram illustrating an operation S150 in a contour probability prediction method of probabilistically predicting a contour, according to at least one embodiment.

FIG. 7 is a diagram illustrating an operation S150 in a contour probability prediction method of probabilistically predicting a contour according to at least one embodiment. FIG. 7 is a diagram illustrating a pattern of one of the result images generated according to the operation S150 of generating a result image corresponding to an image for probabilistically predicting a wafer in FIG. 1.

Referring to FIG. 7, through deep-learning-training, a contour probability prediction model 10 for probabilistically predicting a contour for a contour probability prediction method 100, which is at least one embodiment of the inventive concepts, may be generated. The trained contour probability prediction model 10 may generate an output image having a shape similar to a probability distribution image, which is output data used for training.

For example, when the cross-directional diameter of the contour average is about 60 nm, a distance value between both peaks of the probability distribution graph appearing accordingly may be represented as about 60 nm. The output image generated through the contour probability prediction model 10 may have a different shape or a different thickness of the boundary distinguished from the surroundings depending on a set threshold value. For example, it may be seen that, when the threshold is about 0.1, the boundary is separated away from the contour average, and when the threshold is about 0.3, the boundary is closer to the contour average compared to when the threshold is about 0.1.

Figure 8A:
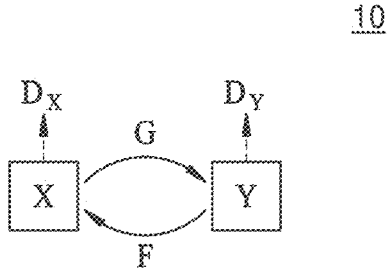
FIGS. 8A to 8C are schematic diagrams illustrating examples of a contour probability prediction model for probabilistically predicting a contour, according to embodiments.
Figure 8B:
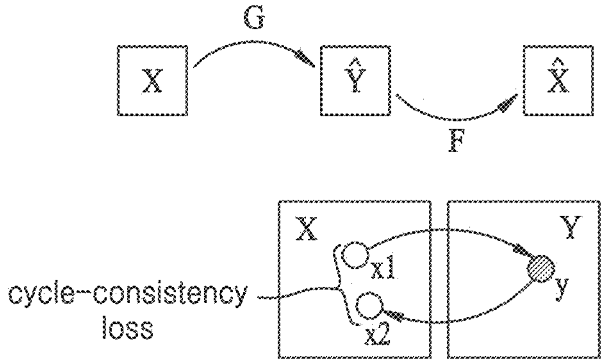
Figure 8C:
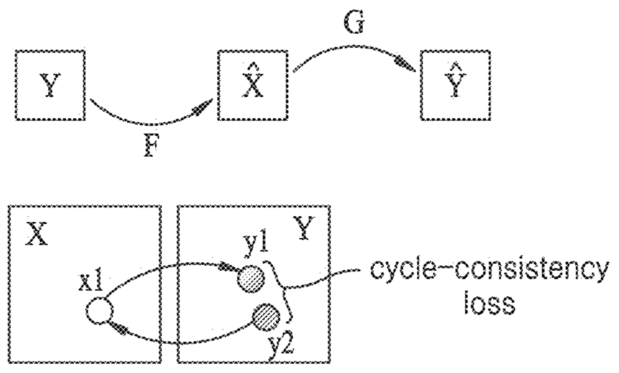

FIGS. 8A to 8C are schematic diagrams illustrating examples of a contour probability prediction model 10 according to embodiments. The model 10 for probabilistically predicting a contour, which is included in the contour probability prediction method 100 may be trained by using a part of a wafer design as an input image and a probability distribution image as an output image.

The contour probability prediction model 10 may have a structure configured to train image-to-image translation. The image-to-image translation has a target to map an input image and an output image to each other by using a training data set consisting of image pairs.

For example, the contour probability prediction model 10 may include an artificial neural network, a decision tree, a support vector machine, a Bayesian network, a genetic algorithm, and/or the like. Hereinafter, at least one embodiment in which the contour probability prediction model 10 is an artificial neural network will be mainly described. This is for convenience of description and does not limit the technical idea of the inventive concepts in any sense. The artificial neural network may include, for example, a convolution neural network (CNN), a region with convolution neural network (R-CNN), a region proposal network (RPN), a recurrent neural network (RNN), a stacking-based deep neural network (S-DNN), a state-space dynamic neural network (S-SDNN), a deconvolution network, a deep belief network (DBN), a Restricted Boltzmann Machine (RBM) network, a Fully Convolutional Network, a Long Short-Term Memory (LSTM) network, a Classification Network, and/or the like. According to some embodiments, the contour probability prediction model 10 may be implemented by, for example, a neural processing unit (NPU), a graphic processing unit (GPU), etc.

According to some embodiments, the contour probability prediction model 10 may be a cycle generative adversarial network (GAN). The GAN may include a generator for generating a fake image from noise and a separator for identifying the fake image. For example, the generator may output a fake image, and the discriminator (or separator) may output the probability of a received imaging being a real image (and/or the probability the received image being a fake image). The discriminator may be trained to identify a simulated image based on the actual image and the simulated image, and the generator may be trained to make the discriminator identify, as an actual image, the simulated image generated by the generator. Accordingly, the trained generator is trained to generate a fake image similar to a real image. A conditioned GAN (cGAN) may be implemented by specifying conditions according to additional information to the generator and the separator. Here, the additional information may be all kinds of auxiliary information, such as class labels or other forms of data. Conditioning may be performed by inputting the additional information to an additional input layer of each of the generator and the separator. An image in which the input image is output through the contour probability prediction model 10 may be referred to as a result image in the disclosure.

The input image may include at least one of a design layout, a resist image, an aerial image, a slope map, a density map, and a photon map.

The design layout refers to a bitmap image or any other suitable form of image composed of a target pattern to be implemented on a wafer. As described above, the left figure of FIG. 6 corresponds to a design diagram showing a part of a design layout of a wafer. That is, in the disclosure, the design diagram image may include a design layout.

The resist image is an image of a photoresist derived by simulation from the design layout. The aerial image is an image representing the intensity distribution of the exposure light reaching the photoresist, derived from the design layout.

The slope map is an image in which the value of each pixel included in the slope map is a gradient of each pixel of the aerial image. The dental map is an image in which a bit value of a specific pixel is determined by a pattern density near the specific pixel.

The photon map is an image obtained by simulating the number of photons reached for each pixel in an exposure process. The output image may be a probability distribution image described with reference to FIGS. 2 to 6.

Design Layout, Resist Image, Aerial Image, Slope Map, Density Map, and Photon Map used in the training stage of the contour probability prediction model 10 may be referred to as training datasets in some cases. The training data set is involved with the design layout already transferred on a wafer and may include an SEM image. The corresponding SEM image may be used for contour extraction described with reference to FIG. 2. The training data set may be collectively referred to as a design image herein.

The target of the cycle GAN is to learn a function that maps domain X and Y. Here, x is a sample belonging to domain X and y is a sample belonging to domain Y. The cycle GAN may include two mapping functions G: X→Y and F: Y→X. The mapping functions G and F may have a reverse translation relationship with each other. The cycle GAN may further include two adversarial discriminators $D_X$ and $D_Y$.

To reduce the space of possible mapping functions, cycle consistency should be satisfied. Here, cycle consistency means that if mapping G and reverse mapping F are performed consecutively for any input, a first input is derived. More specifically, referring to FIG. 8B, a relation in which element x1 of domain X is mapped to element y of domain Y by G and the element y is mapped to another element x2 of domain X by F, may be defined as a cycle-consistency loss, that is, an objective function. Similarly, referring to FIG. 8C, a relation in which element x of domain X is mapped to element y1 of domain Y by G, and element y2 different from element y1 is mapped to the element x of domain X by F, may be defined as a cycle-consistency loss, that is, an objective function. By adding the above-described cycle-consistency loss to the objective function, it is possible to prevent mode collapse of outputting the same output image regardless of the input image.

Accordingly, the objective function of cycle GAN consists of two types of terms: adversarial losses and cycle-consistency losses. More specifically, the objective function of the cycle GAN follows Equation 1 below.

$$L(G, F, D_X, D_Y) = L_{GAN}(G, D_Y, X, Y) + L_{GAN}(F, D_X, Y, X) + \lambda L_{cyc}(G, F) \quad \text{[Equation 1]}$$

Here, $L_{GAN}(G, D_Y, X, Y)$ is an objective function representing the adversarial loss with respect to the mapping function G and follows Equation 2 below.

$$L_{GAN}(G, D_Y, X, Y) = E_{y\sim p_{data}(y)}[\log D_Y(y)] + E_{x\sim p_{data}(x)}[\log(1 - D_Y(G(x))] \quad \text{[Equation 2]}$$

G minimizes the objective function of Equation 2, and $D_Y$ maximizes the objective function of Equation 2, which may be simply expressed as $\min_G \max_{D_y} L_{GAN}(G, D_Y, X, Y)$.

$L_{GAN}(F, D_X, Y, X)$ is an objective function representing the adversarial loss with respect to the mapping function F, and follows Equation 3 below.

$$L_{GAN}(F, D_X, Y, X) = E_{x\sim p_{data}(x)}[\log D_X(x)] + E_{y\sim p_{data}(y)}[\log(1 - D_X(F(y))] \quad \text{[Equation 3]}$$

F minimizes the objective function of Equation 3, and $D_X$ maximizes the objective function of Equation 3, which may be simply expressed as $\min_G \max_{D_y} L_{GAN}(F, D_X, Y, X)$.

$L_{cyc}(G, F)$ is the cycle-consistency loss described above, and follows Equation 4 below. λ may be determined according to the relative importance of the objective functions of Equations 2 and 3.

$$L_{cyc}(G,F) = E_{x\sim p_{data}(x)}[\|F(G(x))-x\|_1] + E_{y\sim p_{data}(y)}[\|G(F(y))-y\|_1] \quad \text{[Equation 4]}$$

Figure 9:
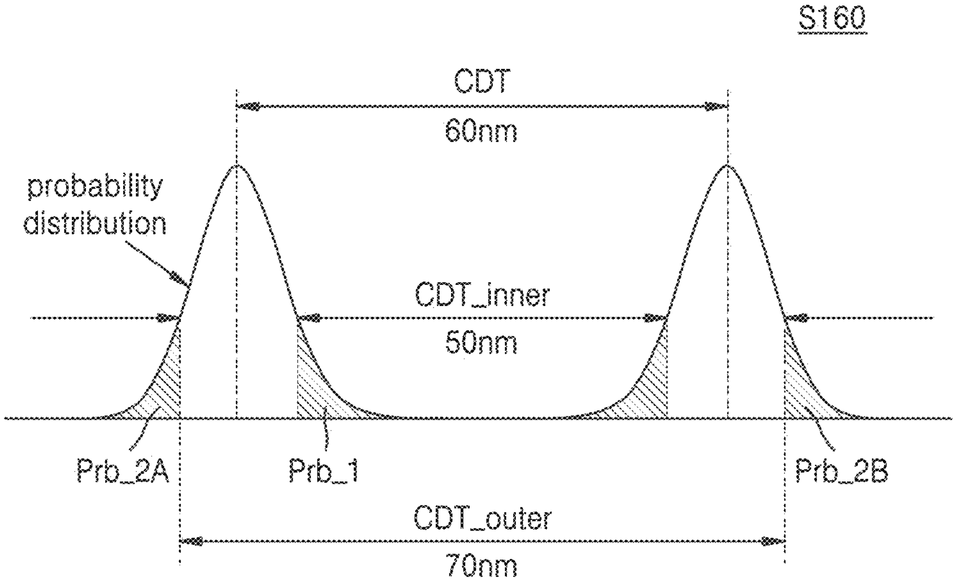
FIG. 9 is a graph illustrating an operation S160 in a contour probability prediction method of probabilistically predicting a contour, according to at least one embodiment.

FIG. 9 is a diagram illustrating an operation S160 in a contour probability prediction method according to at least one embodiment.

Referring to FIG. 9, a defect probability of a pattern provided in a wafer may be predicted through a result image generated through the contour probability prediction model 10 (see FIGS. 8A to 8C). In this disclosure, whether or not the critical dimensions (CD) are defective is described as an example, but it is also applicable to other defects that may occur in the pattern. For example, the problem of wafer defects, particles, and critical dimensions (CD) may be referred to as defects in this disclosure. The description made in FIG. 9 may correspond to an operation (S160) of predicting a hot spot on a wafer through the probability prediction image in FIG. 1.

For example, a critical dimension of an ideal target pattern may be 60 nm. It is assumed that the probability distribution of the result image by the probability prediction model 10 follows the Gaussian distribution as an example. However, the probability distribution is not limited to the case of the Gaussian distribution. For example, in at least one embodiment, the probability distribution may be symmetric or asymmetric. The probability distribution of the result image generated by inputting the limited number of contour images to the probability prediction model 10 may be the same as the graph of FIG. 9. As a desirable pattern size of the target pattern, the outer critical dimension threshold CDT_outer may be set to 70 nm and the inner critical dimension threshold CDT_inner may be set to 50 nm.

In the disclosure, a standard that does not deviate from an outer critical dimension threshold CDT_outer or an inner critical dimension threshold CDT_inner may be referred to as an effective standard. That is, the standard in which the pattern may perform a desired function may be referred to as an effective standard in the disclosure. A predetermined valid standard may be set according to a target pattern, and the predetermined valid standard may be set as a range. For example, referring to FIG. 9, a predetermined effective standard range of the target pattern may be 50 nm to 70 nm.

A pattern deviating from the outer critical dimension threshold CDT_outer or the inner critical dimension threshold CDT_inner may correspond to a defect. For example, when the critical dimension of the pattern in which the process is performed is 75 nm, the corresponding pattern may correspond to a defect pattern.

The probability in which a pattern deviating from the outer critical dimension threshold CDT_outer occurs may be proportional to second areas Prb_2A and Prb_2B, which are integral values of the graph of the range deviating from the outer critical dimension threshold CDT_outer in the probability distribution graph. The probability in which a pattern deviating from the inner critical dimension threshold CDT_inner occurs may be proportional to a first area Prb_1, which is an integral value of the graph of the range deviating from the inner critical dimension threshold CDT_inner in the probability distribution graph.

The ratio value of the second area Prb_2A and Prb_2B based on the entire area of the probability distribution of FIG. 9, corresponds to the probability in which a pattern deviating from the outer critical dimension threshold CDT_outer occurs. The ratio value of the first area Prb_1 based on the entire area of the probability distribution of FIG. 9, corresponds to the probability in which a pattern deviating from the inner critical dimension threshold CDT_inner occurs. That is, based on the total area of the probability distribution, the sum of the first area Prb_1 and the second areas Prb_2A and Prb_2B represent the probability in which the target pattern corresponds to a defect pattern.

The probability prediction model 10 may calculate a probability value corresponding to a defect pattern. The probability value corresponding to the defect pattern may mean a probability value in which each of the plurality of target patterns deviates from a predetermined valid standard. When a probability value corresponding to the defect pattern is equal to or greater than a predetermined probability value (or threshold value), the probability prediction model 10 may designate that the target pattern is a defect or a hotspot and output a result.

In at least one embodiment, when the result image according to the probability prediction model 10 is a probability distribution that follows the Gaussian probability distribution, the predetermined probability may be set to about 0.006%, which is a probability corresponding to the 4-sigma rule to about 0.3%, which is a probability corresponding to the 3-sigma rule. For example, when the predetermined probability is set to 0.3%, and the probability of the target pattern being out of the predetermined valid standard is equal to or greater than 0.3%, the probability value of the target pattern corresponding to a defect pattern is greater than the probability of deviating from the predetermined valid standard, and thus, the probability prediction model 10 may output a result by designating the target pattern as a defect pattern or hot spot. However, the predetermined probability value of the inventive concepts is not limited by the description described above.

The contour probability prediction method 100, according to at least one embodiment, undergoes deep-learning-training by putting an input image corresponding to a design image and an output image corresponding to a probability distribution image into a probability prediction model 10 for target patterns included in a part of a wafer. Through this, it is possible to input a design image of all or part of the wafer into the trained probability prediction model 10 to output a result image including hot spots and defect probability predictions. In at least one example embodiment, the trained probability prediction model 10 can participate in the control of an apparatus configured to produce the wafer and/or photomask. For example, in some example embodiments, a layout and/or process may be confirmed based on the predictions of the trained probability prediction model 10, thereby indicating that the layout is verified to proceed to manufacture, and/or the process may be paused (and/or stopped) if the trained probability prediction model 10 identifies a hotspot wherein the probability of the target pattern being out of the valid standard (e.g., a desired or predetermined valid standard) is greater than the threshold. In at least one embodiment, e.g., wherein the trained probability prediction model 10 identifies a hot spot, the photomask may be reprocessed, if the defect can be corrected, or discarded if the defect cannot be corrected. In at least one embodiment, the trained probability prediction model 10 may generate a correction for the hot spot. For example, in at least one embodiment the trained probability prediction model 10 may output a second image representing a design without the hot spot and/or correct the hot spot before allowing the layout to proceed to manufacture. As such, the trained probability prediction model 10 may confirm new patterns and/or layouts and/or identify potential issues with the new patterns and/or layouts not otherwise practically identified without testing the new patterns and/or layout. Therefore, the trained probability prediction model 10 may reduce the time, waste, expensive of developing new patterns and/or layouts.

The probability prediction model 10 may be trained through a limited number of contour images according to the contour probability prediction method 100, which is at least one embodiment of the inventive concepts. Therefore, compared to other prediction models trained through a large number of input and output images, probabilistic prediction for aspects of defects may be performed even with relatively short time and low level of computing resources through the contour probability prediction method 100, which is at least one embodiment of the inventive concepts.

Through the result of performing probabilistic prediction on the aspect of defects, a specific pattern having a relatively high probability of occurrence of defects may be predicted. Accordingly, since the process of the target pattern can be improved by preemptively establishing a plan to reduce the defect pattern, the semiconductor development process may be improved through the contour probability prediction method 100, according to at least one embodiment of the inventive concepts.

Figure 10:
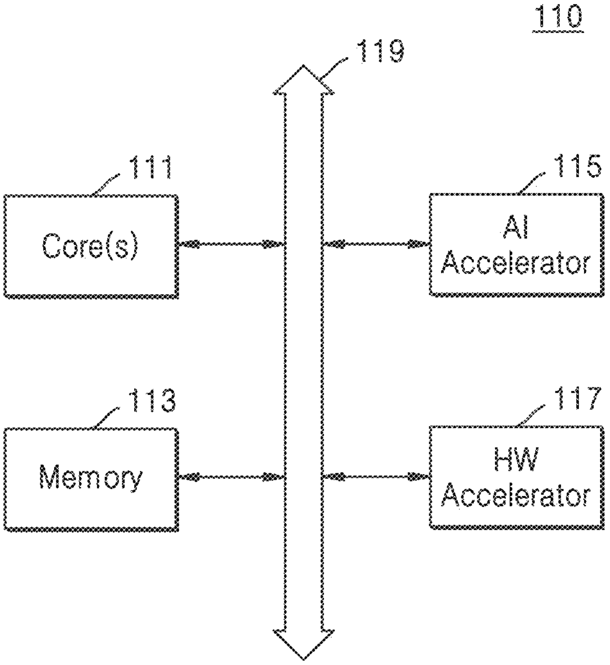
FIG. 10 is a block diagram illustrating a contour probability prediction apparatus for probabilistically predicting a contour, according to at least one embodiment.

FIG. 10 is a block diagram illustrating a contour probability prediction apparatus 110 for probabilistically predicting a contour according to at least one embodiment. In some embodiments, the contour probability prediction apparatus 110 of FIG. 10 is configured to perform the contour probability prediction method 100, described with reference to FIGS. 1 to 8C.

Referring to FIG. 10, the contour probability prediction apparatus 110 may include at least one core 111, a memory 113, an artificial intelligence (AI) accelerator 115, and hardware accelerator 117. The at least one core 111, the memory 113, the AI accelerator 115, and the hardware accelerator 117 may communicate with each other through a bus 119. In some embodiments, the at least one core 111, the memory 113, the AI accelerator 115, and the hardware accelerator 117 may be included in one semiconductor chip. In addition, in some embodiments, at least two of the at least one core 111, the memory 113, the AI accelerator 115, and the hardware accelerator 117 may be included in two or more semiconductor chips mounted on a wafer.

The at least one core 111 is configured to execute instructions. For example, the at least one core 111 may execute an operating system by executing commands stored in the memory 113 and may execute applications executed on the operating system. In some embodiments, the at least one core 111 may instruct the AI accelerator 115 and/or the hardware accelerator 117 to perform a task by executing commands, and may obtain a result of performing the task from the AI accelerator 115 and/or the hardware accelerator 117. In some embodiments, the at least one core 111 may be an Application Specific Instruction Set Processor (ASIP) customized for a specific purpose, or may support a dedicated instruction set.

The memory 113 may have an arbitrary structure for storing data. For example, the memory 113 may include a volatile memory device such as random-access memory (RAM), dynamic RAM (DRAM), static RAM (SRAM), etc., and a nonvolatile memory device such as flash memory, resistive RAM (ReRAM), etc. The at least one core 111, the AI accelerator 115, and the hardware accelerator 117 may store data in the memory 113 or read data from the memory 113 through the bus 119.

The AI accelerator 115 may refer to hardware designed for AI applications. In some embodiments, the AI accelerator 115 may include a neural processing unit (NPU) for implementing a neuromorphic structure, generate output data by processing input data provided from the at least one core 111 and/or the hardware accelerator 117, and provide the output data to the at least one core 111 and/or the hardware accelerator 117. In some embodiments, the AI accelerator 115 may be programmable and programmed by the at least one core 111 and/or the hardware accelerator 117.

The hardware accelerator 117 may refer to hardware designed to perform a specific task at high speed. For example, the hardware accelerator 117 may be designed to perform data conversion such as demodulation, modulation, coding, decoding, and the like at high speed. The hardware accelerator 117 may be programmable and programmed by the at least one core 111 and/or the hardware accelerator 117.

The contour probability prediction apparatus 110 may perform a method for modeling a semiconductor process according to at least one embodiment of this disclosure and may be referred to as an apparatus for modeling a semiconductor process. For example, the AI accelerator 115 may perform the operations of the contour probability prediction model 10 described with reference to FIGS. 8A to 8C.

While the inventive concepts have been particularly shown and described with reference to embodiments thereof, it will be understood that various changes in form and details may be made therein without departing from the spirit and scope of the following claims.

What is claimed is:

1. A contour probability prediction training method for probabilistically predicting a contour, the contour probability prediction training method comprising:

measuring a wafer with an imaging device to obtain an image of the wafer on which a process has been performed according to a design image;

acquiring a plurality of contour images for the image of the wafer;

determining a contour average and a contour standard deviation from the plurality of contour images;

generating a probability distribution image representing a probability distribution, based on the contour average and the contour standard deviation; and deep-learning-training a probability prediction model using the design image and the probability distribution image as inputs for the probability prediction model, wherein the determining the contour average includes dithering the plurality of contour images, overlapping the plurality of contour images which have been dithered, generating the contour average from the plurality of contour images that have been overlapped, and the determining the contour standard deviation is based on the contour average.

2. The method of claim 1, further comprising:

generating a wafer probability prediction image for the design image by inputting at least a part of the design image of the wafer to the probability prediction model after the deep-learning-training.

3. The method of claim 2, wherein, in the generating of the image, the design image corresponds to an entirety of the wafer on which the process has been performed.

4. The method of claim 1, wherein the plurality of contour images correspond to a portion of the wafer.

5. The method of claim 1, wherein the plurality of contour images comprises ten images or less.

6. The method of claim 1, measuring a wafer with an imaging device comprises the wafer in an after development inspection (ADI) state or the wafer in an after clean inspection (ACI) state of the wafer.

7. The method of claim 6, wherein the ADI and ACI are inspection processes for checking at least one of defects, particles, or critical dimensions (CD) of the wafer.

8. The method of claim 6, wherein the process performed on the wafer includes an extreme ultraviolet (EUV) photolithography process.

9. The method of claim 3, wherein the generating of the wafer probability prediction image comprises generating the wafer probability prediction image by representing the contour average and the contour standard deviation according to the probability prediction model.

10. The method of claim 9, wherein the probability distribution comprises a Gaussian distribution.

11. The method of claim 9, further comprising:

outputting a corresponding target pattern as a hotspot when a probability value, corresponding to a probability of a defect pattern forming, of each of a plurality of target patterns included in the wafer probability prediction image is equal to or greater than a threshold value.

12. The method of claim 11, wherein the probability value corresponding to the defect pattern is a value representing a probability that each of the plurality of target patterns deviates from a valid standard.

13. The method of claim 11, wherein the threshold value in which the defect pattern is likely to occur is a value between 0.006% to 0.3%.

14. The method of claim 1, wherein the probability prediction model is a generative adversarial network (GAN).

15. A contour probability prediction method for probabilistically predicting a contour, the contour probability prediction method comprising:

measuring a wafer with an imaging device to obtain an image of the wafer on which a process has been performed according to a design image;

acquiring a plurality of contour images for the image of the wafer;

determining a contour average and a contour standard deviation from the plurality of contour images;

generating a probability distribution image representing a probability distribution based on the contour average and the contour standard deviation;

deep-learning-training a probability prediction model using at least a portion of the design image and at least a portion of the probability distribution image corresponding to at least the portion of the design image as inputs for the probability prediction model;

generating a wafer probability prediction image for the design image by inputting the design image of the wafer to the probability prediction model after the deep-learning-training; and outputting a corresponding target pattern as a hotspot when a probability value, corresponding to a probability of a defect pattern forming, of each of a plurality of target patterns included in the generated wafer probability prediction image is equal to or greater than a threshold value, wherein the probability value corresponding to the defect pattern is a value representing a probability that each of the plurality of target patterns deviates from a valid standard, the determining the contour average includes dithering the plurality of contour images, overlapping the plurality of contour images which have been dithered, generating the contour average from the plurality of contour images that have been overlapped, and the determining the contour standard deviation is based on the contour average.

16. The contour probability prediction method of claim 15, wherein the probability prediction model is configured to predict a probability of defects caused by exposure to extreme ultraviolet (EUV).

17. The contour probability prediction method of claim 15, wherein the plurality of contour images are scanning electron microscope (SEM) images, and content of the design image is one of Design Layout, Resist Image, Aerial Image, Slope Map, Density Map, or Photon Map.

18. The contour probability prediction method of claim 15, wherein the plurality of contour images includes ten images or less.

19. A contour probability prediction method of probabilistically predicting a contour, the contour probability prediction method comprising:

measuring a wafer with an imaging device to obtain an image of the wafer on which an extreme ultraviolet (EUV) photolithography process has been performed according to a design image;

acquiring a plurality of contour images for the image of a portion of the wafer in an after development inspection (ADI) state or in an after clean inspection (ACI) state;

determining a contour average and a contour standard deviation from the plurality of contour images;

generating a probability distribution image representing a probability distribution based on the contour average and the contour standard deviation;

deep-learning-training a probability prediction model using at least the portion of the design image and at least a portion of the probability distribution image corresponding to at least the portion of the design image as inputs for the probability prediction model;

generating a wafer probability prediction image for the design image by inputting the design image of the wafer to the probability prediction model after the deep-learning-training; and outputting a corresponding target pattern as a hotspot when a probability value, corresponding to a probability of a defect pattern forming, of each of a plurality of target patterns included in the generated wafer probability prediction image is equal to or greater than a threshold value, wherein the probability value corresponding to the defect pattern is a value representing a probability that each of the plurality of target patterns deviates from a valid standard, the determining the contour average includes dithering the plurality of contour images, overlapping the plurality of contour images which have been dithered, generating the contour average from the plurality of contour images that have been overlapped, and the determining the contour standard deviation is based on the contour average.

20. The contour probability prediction method of claim 19, wherein, in the acquiring of the plurality of contour images, the plurality of contour images includes ten images or less, the probability distribution is a Gaussian probability distribution, and the threshold value is a value between 0.006% to 0.3%.

* * * * *